United States Patent
Jang et al.

(10) Patent No.: US 6,170,297 B1
(45) Date of Patent: Jan. 9, 2001

(54) JIG FOR MANUFACTURING LONG PERIOD GRATING FILTER AND APPARATUS AND METHOD FOR MANUFACTURING LONG PERIOD GRATING FILTER USING THE SAME

(75) Inventors: Joo-nyung Jang; Kyung-ho Kwack, both of Yongin (KR)

(73) Assignee: SamSung Electronics Co., Ltd., Suwon (KR)

( * ) Notice: Under 35 U.S.C. 154(b), the term of this patent shall be extended for 0 days.

(21) Appl. No.: 09/140,389

(22) Filed: Aug. 26, 1998

(30) Foreign Application Priority Data

Aug. 26, 1997 (KR) .................................................. 97-41200

(51) Int. Cl.$^7$ .................................................. G01N 23/00
(52) U.S. Cl. .............................. 65/378; 65/384; 65/402; 65/433; 65/425; 264/1.27; 451/41
(58) Field of Search .............................. 65/377, 378, 384, 65/402, 425, 433; 264/1.24, 1.27; 451/41

(56) References Cited

U.S. PATENT DOCUMENTS

| | | | | |
|---|---|---|---|---|
| 3,535,018 | * | 10/1970 | Vasilatos | ................................ 385/115 |
| 3,969,016 | * | 7/1976 | Kaiser et al. | ..................... 350/96.15 |
| 4,049,413 | * | 9/1977 | French | ................................ 65/392 |
| 4,662,710 | * | 5/1987 | ten Berge | .......................... 350/96.1 |
| 5,411,566 | * | 5/1995 | Poole et al. | .......................... 65/402 |
| 5,620,495 | * | 4/1997 | Aspell et al. | .......................... 65/392 |
| 5,681,417 | * | 10/1997 | Jacobs | ................................ 156/344 |
| 6,050,109 | * | 4/2000 | Kosinski et al. | ..................... 65/385 |

\* cited by examiner

Primary Examiner—Sean Vincent
(74) Attorney, Agent, or Firm—Robert E. Bushnell, Esq.

(57) ABSTRACT

An apparatus and method used in manufacturing a long period grating filter are provided. The apparatus used in manufacturing a long period grating filter includes an upper body including a plurality of teeth spaced from each other by a predetermined distance and a lower body having teeth spaced from each other by the same distance as the teeth of the upper body and a plurality of grooves in a direction perpendicular to the teeth in which an optical fiber is loaded, wherein the upper and lower bodies are engaged with each other, and a plurality of grooves are formed in the loaded optical fiber by abrading the loaded optical fiber by moving the upper body in a direction parallel to the teeth. According to the present invention, an excimer laser, various other expensive equipment, and an optical fiber sensitive to ultra-violet rays are not required for manufacturing the long period grating filter. Accordingly, complicated hydrogen processing is not necessary. Also, stability to temperature is excellent, since the resultant filter is not obtained by changing the refractive index of the optical fiber.

20 Claims, 4 Drawing Sheets

JIG FOR MANUFACTURING LONG PERIOD GRATING FILTER AND APPARATUS AND METHOD FOR MANUFACTURING LONG PERIOD GRATING FILTER USING THE SAME

CLAIM OF PRIORITY

This application makes reference to, incorporates the same herein, and claims all benefits accruing under 35 U.S.C. § 119 from an application entitled Jig For Manufacturing Long Period Grating Filter And Apparatus And Method For Manufacturing Long Period Grating Filter Using The Same earlier filed in the Korean Industrial Property Office on Aug. 26, 1997, and there duly assigned Ser. No. 41200/1997, a copy of which is annexed hereto.

BACKGROUND OF THE INVENTION

1. Technical Field

The present invention relates to a jig for manufacturing a long period grating filter, and more particularly to an apparatus and a method for manufacturing a long period grating filter.

2. Related Art

An optical fiber communication system consists of an information source, a transmitter or modulator, a transmission medium, and a receiver or demodulator at a destination point. The information source provides an electrical signal to the transmitter. The transmitter comprises an electrical stage which drives an optical source to give modulation of the light-wave carrier. The optical source which provides the electrical-optical conversion may be a semiconductor laser. The transmission medium consists of an optical fiber cable. The receiver consists of an optical detector which drives a further electrical stage and hence provides demodulation of the optical carrier. Thus there is a requirement for electrical interfacing at either end of the optical link. Fiber optic communications offer major advantages over wire systems because of low attenuation and high bandwidth available.

An optical fiber cable is an optical fiber waveguide having a core of a first refractive index $n_1$ surrounded by a transparent cladding of slightly lower refractive index $n_2$. The cladding supports the waveguide structure while also substantially reducing radiation loss into surrounding air. The optical fiber cable corresponds to a single cylindrical glass fiber having a diameter comparable to the diameter of a human hair. The optical fiber cable acts as an open optical waveguide. Light which is launched into an optical fiber at an angle less than an acceptance angle demonstrates total internal reflection in the core of the optical fiber. Periodic structures may be incorporated into optical fibers to form optical filters.

An optical filter can be used to guide light to the core of an optical fiber causing the light of desirable wavelengths to propagate in the core of that optical fiber. One type of optical filter is a long period grating filter. The long period grating filter is manufactured by periodically changing the refractive index of the core of an optical fiber. I have discovered that the manufacturing process can be inefficient, time-consuming, and expensive.

I have found that there is a need for an improved apparatus and method used in manufacturing long period grating filters.

SUMMARY OF THE INVENTION

To solve the above problems and others, it is an objective of the present invention to provide an apparatus and a method used in manufacturing a long period grating filter, for physically changing the core of an optical fiber and changing the effective refractive index of the optical fiber.

To achieve these and other objects in accordance with the principles of the present invention, as embodied and broadly described, the present invention provides an apparatus used in manufacturing a long period grating filter, comprising: an upper body including a first plurality of teeth spaced apart by a predetermined distance, each tooth among said first plurality of teeth extending in a first direction, said first plurality of teeth being formed at a lower side of said upper body; a lower body including a second plurality of teeth spaced apart by said predetermined distance, each tooth among said second plurality of teeth extending in said first direction, said lower body defining a first plurality of grooves extending in a second direction perpendicular to said first direction, said first plurality of grooves receiving a plurality of optical fibers, said second plurality of teeth and said first plurality of grooves being formed at an upper side of said lower body; and said upper body engaging said lower body and forming a second plurality of grooves in said plurality of optical fibers by abrading said plurality of optical fibers, said abrading of said plurality of optical fibers being performed when said upper body moves in said first direction.

To achieve these and other objects in accordance with the principles of the present invention, as embodied and broadly described, the present invention provides an apparatus used in manufacturing a long period grating filter, comprising: an optical fiber having a first end and a second end, and having a core surrounded by a cladding, said cladding defining a plurality of grooves spaced apart by a predetermined distance; a light source emitting a first light into said first end of said optical fiber; a measuring unit receiving a second light emitted from a second end of said optical fiber, measuring characteristics of said second light, and transmitting data corresponding to said characteristics of said second light; a heating unit heating said plurality of grooves; a control unit receiving said data from said measuring unit, controlling said heating in accordance with said data; and said core of said optical fiber deforming in response to said heating of each groove of said plurality of grooves by said heating unit, said deforming occurring while moving said heating unit to each groove of said plurality of grooves.

To achieve these and other objects in accordance with the principles of the present invention, as embodied and broadly described, the present invention provides a method of manufacturing a long period grating filter, comprising the steps of: forming a plurality of grooves in a cladding of an optical fiber; removing a coating from said optical fiber; and deforming a core of said optical fiber by heating regions at said plurality of grooves causing light propagating in said optical fiber to become coupled to said cladding at a predetermined wavelength.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DESCRIPTION OF THE PREFERRED EMBODIMENT

In general, a long period grating filter is a device for coupling a core mode which proceeds to the core of an optical fiber, to a cladding mode, and is manufactured by periodically changing the refractive index of the core of an optical fiber which is sensitive to ultraviolet rays. Namely, the refractive index increases in the part exposed to the ultraviolet rays, and does not change in the remaining part, thus generating a periodic change of the refractive index. The following Equation 1 must be met in order to couple the core mode to the cladding mode.

EQUATION 1

$$\beta_{co} - \beta^n_{cl} = (2\pi/\Lambda)$$

In Equation 1 shown immediately above, $\beta_{co}$, $\beta^n_{cl}$, and $\Lambda$ respectively represent a propagation constant of a core mode, a propagation constant of an nth order cladding mode, and a grating period. In the Equation 1, $\beta$ is replaced by $2\pi n/\lambda$, wherein n is refractive index, and the difference between the refractive index of the core mode and that of the cladding mode is as follows: $n_{co} - n_{cl} = \lambda/\Lambda$. Therefore, when a certain wavelength is to be coupled to the cladding mode, the period $\lambda$ and the refractive index difference are to be determined. The refractive index difference to be determined is as follows: $n_{co} - n_{cl}$. The refractive index difference can be obtained by appropriately exposing the optical fiber sensitive to ultraviolet rays to the ultraviolet laser.

In a long period grating filter manufacturing apparatus, a mask can be comprised of a first pattern obtained by depositing a first material on a substrate and patterning the deposited substrate. A laser is selectively transmitted due to the first pattern. However, the first pattern has a low damage threshold. Accordingly, it is not possible to effectively use an excimer laser of high output power. Moreover, the mask has only one period since the first pattern is formed on the substrate. Also, the optical fiber core must be hydrogenated after adding a second material thereto, in order to obtain an optical fiber sensitive to ultraviolet rays. Since the hydrogenated optical fiber is unstable over time, a stabilizing process is necessary. These processes can be costly, time-consuming, and inefficient.

Figure 1:
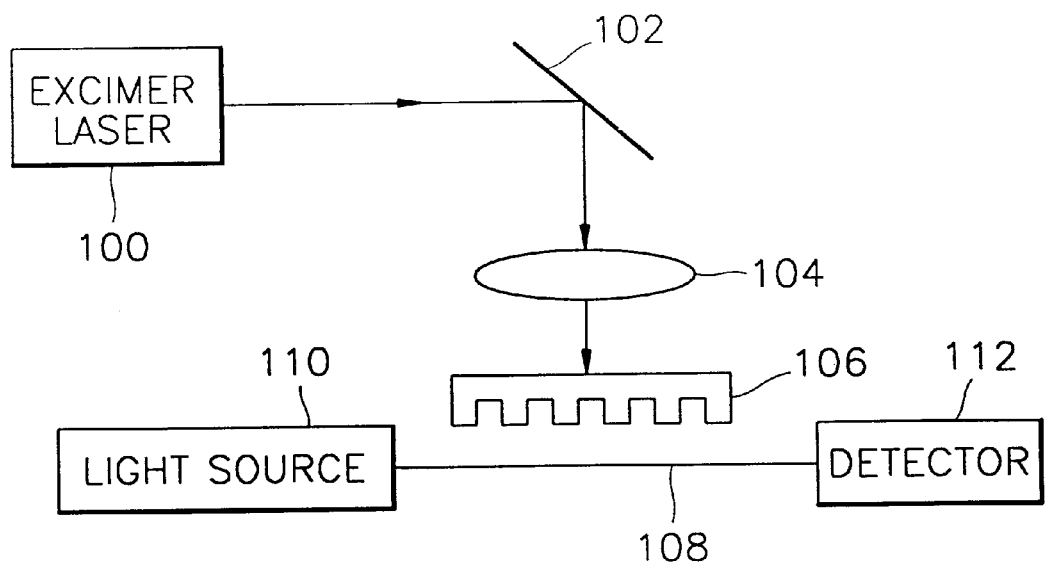
FIG. 1 illustrates an apparatus used in manufacturing a long period grating filter.

Refer now to the drawings, and turn to FIG. 1, which illustrates an apparatus used in manufacturing a long period grating filter. The apparatus used in manufacturing a long period grating filter by irradiating the ultraviolet laser will be described as follows. FIG. 1 schematically shows a long period grating filter manufacturing apparatus. The long period grating filter manufacturing apparatus according to FIG. 1 includes an excimer laser light source 100 which can output ultraviolet laser light at high power, a mirror 102 for changing the path of the laser beam emitted from the excimer laser light source 100, a lens 104 for controlling the focus of the laser beam reflected from the mirror 102, a silica mask 106 for selectively transmitting the laser beam which passed through the lens 104, and an optical fiber 108. The long period grating is formed in the core of the optical fiber 108 by irradiating the laser which passed through the silica mask 106.

A process of manufacturing the long period grating filter using the above structure is as follows. The laser is transmitted through the lens 104 and is irradiated onto the optical fiber 108 contacting the silica mask 106. At this time, the laser is irradiated onto the optical fiber 108, thus forming the long period gratings having different refractive indices. It is possible to obtain a long period grating filter having desired characteristics by transmitting light from a light source 110 through the optical fiber 108 and detecting the light with a detector 112.

In the above long period grating filter manufacturing apparatus, the silica mask 106 is comprised of a chromium pattern obtained by depositing chromium on a silica substrate and patterning the deposited substrate. The laser is selectively transmitted due to the chromium pattern. However, the chromium pattern has a low damage threshold, typically about 100 mJ/cm$^2$. That is, the damage threshold of the chromium pattern is approximately 100 millijoules per centimeter$^2$. Accordingly, it is impossible to effectively use an excimer laser of high output power. Moreover, the silica mask has only one period since the chromium pattern is formed on the silica substrate. Also, the optical fiber core must be hydrogenated after adding germanium thereto, in order to obtain an optical fiber sensitive to ultraviolet rays. Since the hydrogenated optical fiber is unstable over time, a stabilizing process is necessary.

Hereinafter, an embodiment of the present invention will be described in detail with reference to the attached drawings. Turn now to FIG. 2, which illustrates a structure of a jig used in manufacturing a long period grating filter, in accordance with the principles of the present invention. The jig shown in FIG. 2 includes an upper body 202 having a plurality of teeth 201 spaced from each other by a predetermined distance and a lower body 206 having teeth 203 spaced from each other by the same distance as the teeth 201 and a plurality of grooves 205 in a direction perpendicular to the teeth 203 in which optical fibers 200 are loaded.

Figure 2:
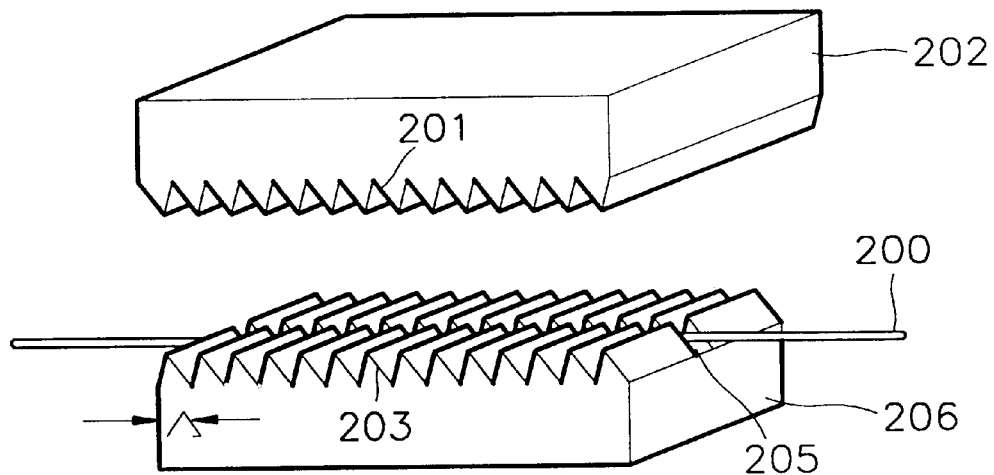
FIG. 2 illustrates a structure of a jig used in manufacturing a long period grating filter, in accordance with the principles of the present invention.

The material of the upper and lower bodies 202 and 206 is an aluminum alloy or other metal alloy. Here, the distance $\Lambda$ between teeth is equal to the period of the optical fiber grating. The lower body 206 includes three or more grooves 205 in the direction perpendicular to the teeth 203. Only one groove 205 is shown in FIG. 2. The groove 205 shown in FIG. 2 can also be referred to as slot 205. When the optical fibers 200 are loaded onto the grooves 205, the teeth of the upper and lower bodies 202 and 206 engage with each other and moved in a direction parallel to the teeth 203 to abrade the optical fibers 200. Al$_2$O$_3$ powder, having a particle size of several micrometers, and water are used during the abrasion. In other words, aluminum oxide powder and water are used during the abrasion. Then, a plurality of grooves are formed in the optical fiber by the abrasion. At this time, since an optical fiber removed of its coating is very fragile, the surface of the optical fiber is abraded together with the coating.

Figure 3:
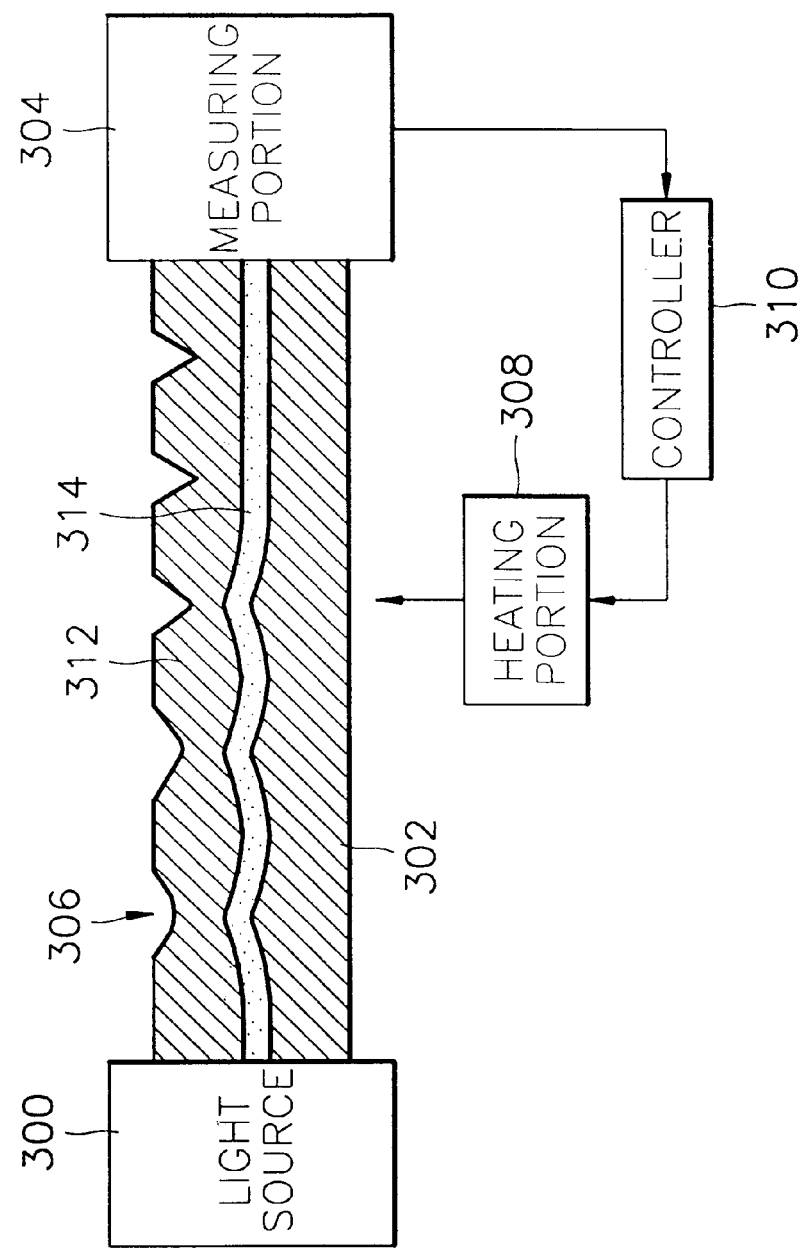
FIG. 3 illustrates a structure of an apparatus used in manufacturing a long period grating filter, in accordance with the principles of the present invention.

Turn now to FIG. 3, which illustrates a structure of an apparatus used in manufacturing a long period grating filter, in accordance with the principles of the present invention. The apparatus shown in FIG. 3 includes a light source 300, an optical fiber 302 connected to the light source 300 and having grooves of a predetermined period in a cladding area, a measuring portion 304 for measuring transmission ratios of various wavelengths of light having passed through the optical fiber 302, a heating portion 308, preferably an arc, for heating the grooves 306 of the optical fiber 302, and a controller 310 which receives the transmission ratio of the optical fiber 302 from the measuring portion 304, and controls the heating by the heating portion 308 so that the optical fiber 302 has a desired transmission ratio. Here, the coating of the optical fiber 302 is removed. Reference numeral 312 denotes a cladding in which grooves 306 are formed. Reference numeral 314 denotes a core deformed by heating.

Figure 4A:
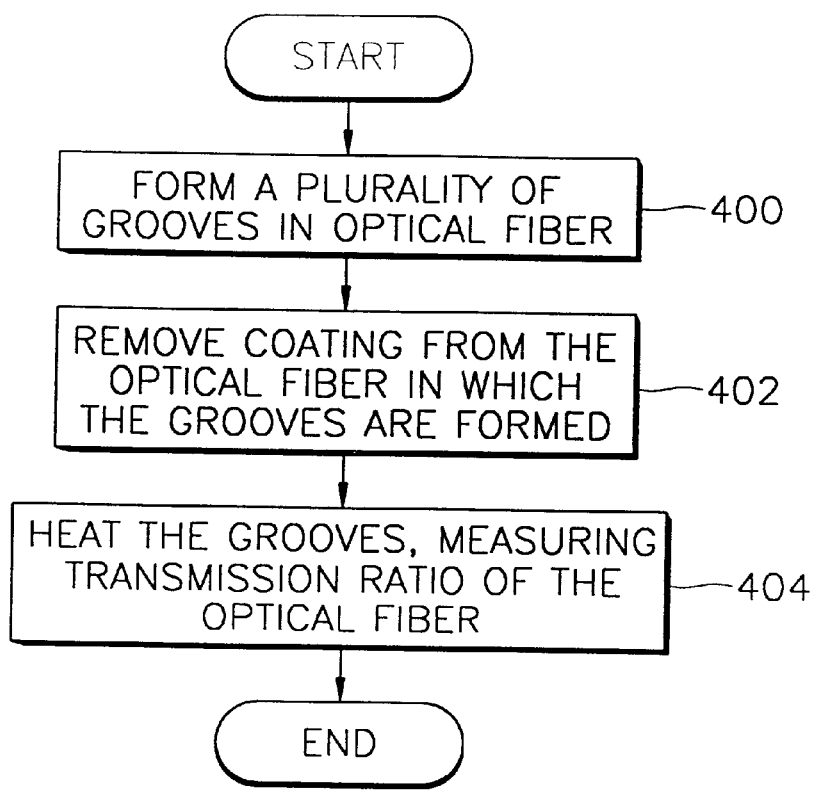
FIG. 4A illustrates a flowchart describing a method of manufacturing a long period grating filter, in accordance with the principles of the present invention.

The long period grating filter manufacturing method using the above structure will be described with reference to FIGS. 4A through 4D. Turn now to FIG. 4A, which illustrates a flowchart describing a method of manufacturing a long period grating filter, in accordance with the principles of the present invention. FIG. 4A is a flowchart showing the long period grating filter manufacturing method. At step 400, a plurality of grooves spaced from each other by a predetermined distance are formed in the optical fiber, using the jig shown in FIG. 2. Here, the distance between the grooves of the optical fiber is equal to the grating period of the long period grating filter. At step 402, after the grooves are formed, the coating of the optical fiber is removed. At this time, the coating of the optical fiber is removed using $CH_2Cl_2$ solution. In other words, the coating of the optical fiber is removed using a dichloromethane solution. At step 404, after the coating is removed, the grooves are heated, preferably using an arc, while measuring the transmission ratio of the optical fiber so as to obtain desired transmission characteristics. Upon heating the grooves of the cladding from which the coating has been removed, the core is deformed by a surface tension effect. The surface tension effect is a phenomenon in which a surface area is reduced while atoms move, since atoms tend towards states of low energy. The heating is performed by applying arcs to each groove of the cladding. The grooves are heated until a desired shape of a rejection peak is obtained, observing a spectrum the rejection peak using a measuring apparatus such as an optical spectrum analyzer.

Figure 4B:
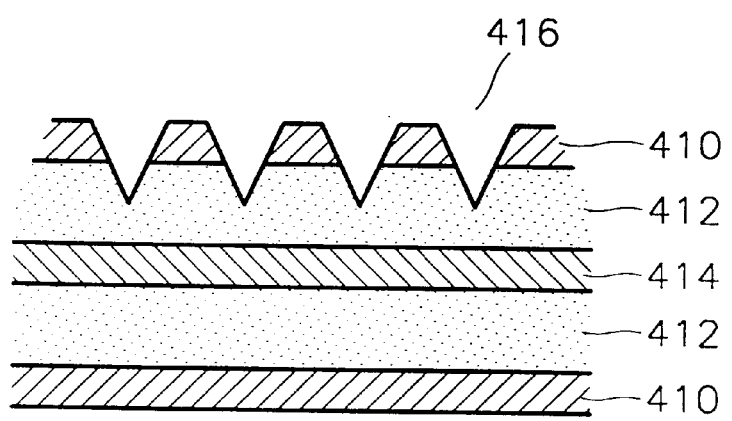
FIG. 4B illustrates a sectional view showing an optical fiber in which grooves are formed, in accordance with the principles of the present invention.

Turn now to FIG. 4B, which illustrates a sectional view showing an optical fiber in which grooves are formed, in accordance with the principles of the present invention. Reference numerals 410, 412, 414, and 416 respectively denote a coating, a cladding, a core, and grooves.

Figure 4C:
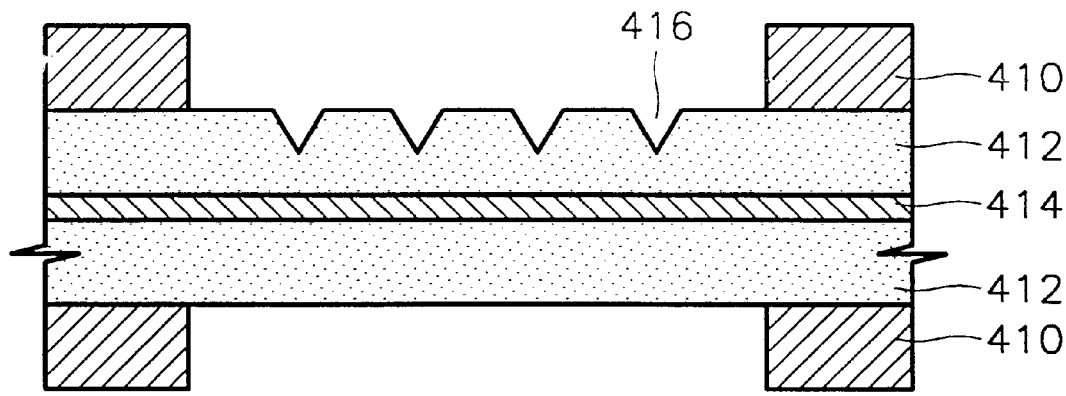
FIG. 4C illustrates a sectional view of an optical fiber removed of its coating, in accordance with the principles of the present invention.

Turn now to FIG. 4C, which illustrates a sectional view of an optical fiber removed of its coating, in accordance with the principles of the present invention. Reference numerals 410, 412, 414, and 416 respectively denote a residual coating, a cladding, a core, and grooves.

Figure 4D:
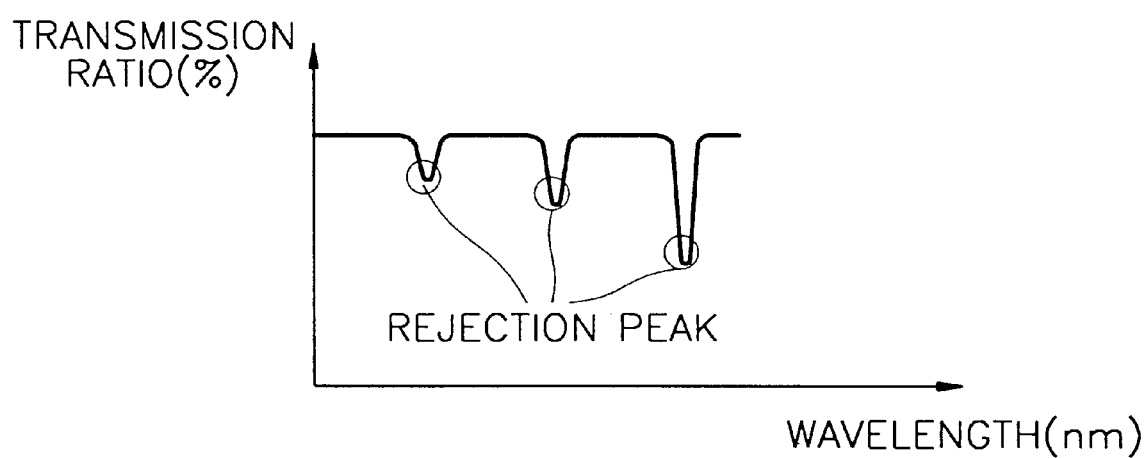
FIG. 4D illustrates an example of rejection peaks, in accordance with the principles of the present invention.

Turn now to FIG. 4D, which shows examples of the rejection peak. Here, the rejection peak means that the transmission ratio is minimized by coupling the core mode of each wavelength to the cladding mode in the long period grating.

According to the present invention, the long period grating filter can be manufactured without an excimer laser, and various other expensive equipment, and the optical fiber need not be sensitive to ultraviolet rays. Accordingly, complicated hydrogen processing is not necessary. Also, stability to temperature is excellent since the resultant filter is not obtained by changing the refractive index of the optical fiber.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method of manufacturing a long period grating filter, comprising the steps of:

forming a plurality of grooves in a cladding of an optical fiber;

removing a coating from said optical fiber; and deforming a core of said optical fiber by heating regions at said plurality of grooves causing light propagating in said optical fiber to become coupled to said cladding mode at a predetermined wavelength, core mode being coupled to said cladding mode by changing a refractive index of said optical fiber, said plurality of grooves being additionally formed in said coating surrounding said cladding.

2. The method of claim 1, wherein said abrading is performed before said removing of said coating from said optical fiber.

3. The method of claim 2, wherein said plurality of grooves are spaced apart by a predetermined distance.

4. The method of claim 3, wherein said predetermined distance is equal to a grating period of said optical fiber.

5. The method of claim 2, wherein said coating is removed during said removing step using a solution comprising $CH_2Cl_2$.

6. The method of claim 1, wherein said coating is removed during said removing step using dichloromethane.

7. The method of claim 2, said forming being performed be an abrading unit, said abrading unit comprising:

an upper body including a first plurality of teeth spaced apart, each tooth among said first plurality of teeth extending in a first direction;

a lower body including a second plurality of teeth spaced apart, each tooth among said second plurality of teeth extending in said first direction, said lower body defining a slot extending in a second direction perpendicular to said first direction, said slot receiving said optical fiber; and said upper body engaging said lower body and forming said plurality of grooves in said optical fiber by abrading said optical fiber, said abrading of said optical fiber being performed when said upper body moves in said first direction.

8. A method, comprising:

forming a plurality of grooves in a cladding of an optical fiber, said forming being performed by an abrading unit, said abrading unit comprising:

an upperbody including a first plurality of teeth, each tooth among said first plurality of teeth extending in a first direction;

a lower body including a second plurality of teeth, each tooth among said second plurality of teeth extending in said first direction, said lower body defining a slot extending in a second direction perpendicular to said first direction, said slot receiving said optical fiber; and said upper body engaging said lower body and forming said plurality of grooves in said optical fiber by abrading said optical fiber, said abrading of said optical fiber being performed when said upper body moves in said first direction; removing a coating from said optical fiber; and deforming a core of said optical fiber by heating said plurality of grooves, said heating causing a core mode to become coupled to a cladding mode at a predetermined wavelength.

9. The method of claim 8, said first plurality of teeth being spaced apart by a predetermined distance, said first plurality of teeth being formed at a lower side of said upper body, said second plurality of teeth being spaced apart by said predetermined distance, said second plurality of teeth and said slot being formed at an upper side of said lower body, said plurality of grooves being spaced apart by said predetermined distance.

10. The method of claim 1, wherein said predetermined distance corresponds to a grating period of said optical fiber.

11. The method of claim 9, wherein said plurality of grooves extend in said first direction.

12. The method of claim 9, wherein said abrading is performed before said removing of said coating from said optical fiber.

13. The method of claim 9, said slot corresponding to a plurality of slots being arranged in a parallel manner, said optical fiber corresponding to a plurality of optical fibers, each one of said slots receiving a respective one of said plurality of optical fibers.

14. A method, comprising:

manufacturing a long period grating filter, said manufacturing comprising:

forming a plurality of grooves in a cladding of an optical fiber, said optical fiber having a first end and a second end, said cladding surrounding a core of said optical fiber, a plurality of grooves being additionally formed in a coating surrounding said cladding;

removing said coating from said optical fiber; and deforming said core of said optical fiber by heating regions at said plurality of grooves, said deforming causing a core mode of light propagating through said optical fiber to become coupled to a cladding mode at a predetermined wavelength, said core mode being coupled to said cladding mode by changing a refractive index of said optical fiber, said deforming being performed by a deforming unit.

15. The method of claim 14, said deforming unit comprising:

a light source emitting a first light into said first end of said optical fiber;

a measuring unit receiving a second light emitted from said second end of said optical fiber, measuring characteristics of said second light, and transmitting data corresponding to said characteristics of said second light;

a heating unit heating said regions at said plurality of grooves;

a control unit receiving said data from said measuring unit, controlling said heating in accordance with said data; and said deforming of said core of said optical fiber being in response to said heating of each groove of said plurality of grooves by said heating unit.

16. The method of claim 15, wherein said heating unit includes an electric arc.

17. The method of claim 15, wherein said measuring unit measures transmission ratios for a first plurality of wavelengths of light.

18. The method of claim 15, wherein said controlling of said heating causes said optical fiber to exhibit predetermined transmission ratios for a plurality of wavelengths of light.

19. The method of claim 17, wherein said controlling of said heating causes said optical fiber to exhibit predetermined transmission ratios for a second plurality of wavelengths of light.

20. The method of claim 15, said optical fiber corresponding to a plurality of optical fibers.

* * * * *